US012034218B2

(12) United States Patent
Da Silveira et al.

(10) Patent No.: US 12,034,218 B2
(45) Date of Patent: Jul. 9, 2024

(54) FRASERA ANTENNA RADIATOR (FAR) FOR 5G ARRAY ANTENNAS

(71) Applicant: Telefonaktiebolaget LM Ericsson (publ), Stockholm (SE)

(72) Inventors: Martin Da Silveira, Ottawa (CA); Neil McGowan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 17/416,747

(22) PCT Filed: Mar. 24, 2020

(86) PCT No.: PCT/IB2020/052764

§ 371 (c)(1),
(2) Date: Jun. 21, 2021

(87) PCT Pub. No.: WO2020/194188

PCT Pub. Date: Oct. 1, 2020

(65) Prior Publication Data

US 2022/0077598 A1 Mar. 10, 2022

Related U.S. Application Data

(60) Provisional application No. 62/823,864, filed on Mar. 26, 2019.

(51) Int. Cl.
*H01Q 21/26* (2006.01)
*H01Q 9/28* (2006.01)

(52) U.S. Cl.
CPC ............... *H01Q 21/26* (2013.01); *H01Q 9/28* (2013.01)

(58) Field of Classification Search
CPC .......... H01Q 21/26; H01Q 9/28; H01Q 1/246; H01Q 1/523
See application file for complete search history.

(56) References Cited

U.S. PATENT DOCUMENTS 7,075,497 B2 7/2006 Teillet et al.
7,821,462 B1 10/2010 Reigle et al.
(Continued)

FOREIGN PATENT DOCUMENTS

DE 10 2005 047 975 A1 4/2007
DE 10 2017 116 920 A1 12/2018
FR 2 863 110 A1 6/2005

OTHER PUBLICATIONS

Invitation to Pay Additional Fees And, Where Applicable, Protest Fee dated Jul. 14, 2020 issued in PCT Application No. PCT/IB2020/052764, consisting of 11 pages.
(Continued)

*Primary Examiner* — Minh D A
(74) *Attorney, Agent, or Firm* — Sage Patent Group

(57) ABSTRACT

An antenna, an antenna structure and antenna element are disclosed. The antenna includes a radiator structure having four radiators, each located within a different quadrant of a plane. Diagonally opposite radiators form a pair. A first ground strip connects a first radiator of a first pair of the set to a ground conductor. A first signal strip connects a second radiator of the first pair to a first terminal. The first ground strip and the first signal strip are orientable to form a balanced transmission line. A second ground strip connects a first radiator of a second pair of the set to a ground conductor and a second signal strip is connects a second radiator of the second pair to a second terminal. The second ground strip and the second signal strip are orientable to form a balanced transmission line.

28 Claims, 13 Drawing Sheets

(56) References Cited

U.S. PATENT DOCUMENTS

| | | | | |
|---|---|---|---|---|
| 2002/0140618 | A1 | 10/2002 | Plet et al. | |
| 2004/0056818 | A1 | 3/2004 | Sledkov | |
| 2005/0168383 | A1* | 8/2005 | Lee | H01Q 1/245 343/846 |
| 2012/0075155 | A1 | 3/2012 | Lindmark et al. | |
| 2014/0035698 | A1* | 2/2014 | Schadler | H01Q 21/0075 333/128 |
| 2014/0327591 | A1 | 11/2014 | Kokkinos | |
| 2017/0062940 | A1* | 3/2017 | Cao | H01Q 1/246 |

OTHER PUBLICATIONS

International Search Report and Written Opinion dated Sep. 21, 2020 issued in PCT Application No. PCT/IB2020/052764, consisting of 23 pages.

Zengdi Bao, "A Novel Broadband Dual-Polarization Antenna utilizing Strong Mutual Coupling" IEEE Transactions on Antennas and Propagation, vol. 62, No. 1; Jan. 2014, consisting of 5 pages.

Gangyi Deng, et al. "A Broadband Dual Polarized Antenna Element for Wireless Communications" Powerwave Technologies, Inc., R&D, IEEE 2007, consisting 4 pages.

Can Ding et al., "Beamwidth Control of Base Station Antennas Employing Reflectors and Directors" Globe Big Data Centre, Faculty of Engineering and IT, University of Technology, Sydney, Australia, School of Micro-Electronics, Xidian University, Xi'an, China, IEEE 2015, consisting of 4 pages.

* cited by examiner

FRASERA ANTENNA RADIATOR (FAR) FOR 5G ARRAY ANTENNAS

CROSS-REFERENCE TO RELATED APPLICATIONS

This application is a Submission Under 35 U.S.C. § 371 for U.S. National Stage Patent Application of International Application No.: PCT/IB2020/052764, filed Mar. 24, 2020, entitled "FRASERA ANTENNA RADIATOR (FAR) FOR 5G ARRAY ANTENNAS," which claims priority to U.S. Provisional Application No. 62/823,864, filed Mar. 26, 2019, entitled "FRASERA ANTENNA RADIATOR (FAR) FOR 5G ARRAY ANTENNAS," the entireties of both of which are incorporated herein by reference.

TECHNICAL FIELD

The present disclosure is related to wireless communication and in particular, to antennas for use in large antenna arrays such as wireless communication network nodes, e.g., base stations.

BACKGROUND

Requirements for antennas for 3rd Generation Partnership Project (3GPP) 5th Generation (5G) (also known as New Radio (NR)) beamforming are very stringent. A factor for good array performance is good antenna radiators. The radiators should not only have good electrical performance but should also have very low weight as there are many radiators in large 5G array antennas.

Radiator spacing close to half a wavelength is used for 5G antenna array beamforming applications to avoid significant performance degradation resulting from grating lobes. Also desired for 5G antenna array beamforming applications are small pattern deviations between radiators.

Radiators that have been designed for technologies prior to 5G, such as for Long Term Evolution (LTE), have a number of radiators in a column with spacing between radiators much greater than half a wavelength (0.7 to 0.85 wavelengths are typical) and typically have either one column or two columns with spacing much greater than half a wavelength. This is done in pre-5G antennas to maximize antenna gain with a minimum number of radiators.

Existing radiators for mobile communication frequencies in use today are not good for 5G beamforming in large closely spaced two-dimensional arrays, because the high radiator gain will cause significant interactions between radiators, resulting in large pattern deviations from the average pattern. In addition, in pre-5G antennas, the weight of the radiators was not considered to be of high importance as the total number of radiators in a pre-5G antenna is relatively small so they did not have to be light weight.

Typical array radiators use coaxial feed structures which require the use of a balun (balanced to unbalanced matching circuit) that makes the feed structure complex to implement.

SUMMARY

Some embodiments advantageously provide antenna structures, antennas and antenna elements for use in large antenna arrays.

According to some embodiments, a Frasera Antenna Radiator (FAR) presented herein is a small, symmetrical, light weight, high efficiency radiator for optimal performance in 5G two-dimensional antenna arrays with spacing on the order of half a wavelength and targeted for mobile communication frequencies.

Some antennas presented herein have optimal performance in a half wavelength spaced antenna array by having a small size for a given frequency and bandwidth. Some antennas presented herein have a radiator geometry with minimal interaction with high and low wall features for good port to port array isolation and pattern matching. Some antennas presented herein have good radiation patterns with low cross polarization and good polarization port to port isolation. Some antennas presented herein have very low loss due to an all metal design, impedance matching of low complexity, and having a low loss feed structure. Also, some antennas presented herein have low cost and low weight compared to some known antennas.

According to one aspect, an antenna includes a radiator structure having a set of four radiators, each radiator located within a different one of four quadrants of a plane. Two of the four radiators of the set are within diagonally opposite quadrants to form a first pair of radiators and another two radiators of the set are within diagonally opposite quadrants to form a second pair of radiators. A first ground strip is configured to connect a first radiator of the first pair of radiators to a ground conductor and a first signal strip is configured to connect a second radiator of the first pair of radiators to a first terminal. The first ground strip and the first signal strip are orientable in proximity to each other to form a first balanced transmission line. A second ground strip is configured to connect a first radiator of the second pair of radiators to the ground conductor and a second signal strip is configured to connect a second radiator of the second pair of radiators to a second terminal. The second ground strip and the second signal strip are orientable in proximity to each other to form a second balanced transmission line.

According to this aspect, in some embodiments, the first signal strip and the first ground strip have flat surfaces orientable to face and be parallel to each other when oriented to form the first balanced transmission line, and the second signal strip and the second ground strip have flat surfaces orientable to face and be parallel to each other when oriented to form the second balanced transmission line. In some embodiments, the first signal strip and the first ground strip each have a first length orientable to be perpendicular to the plane, and wherein the second signal strip and the second ground strip each have a second length orientable to be perpendicular to the plane. In some embodiments, each radiator has multiple edges, each of two edges of the multiple edges having a flange facing a flange of an adjacent radiator, each flange extending away from the plane, the facing flanges providing mutual coupling of signals between adjacent radiators. In some embodiments, the first terminal is connected to a source or receiver of an RF signal and the second terminal is connected to a source or receiver of an RF signal. In some embodiments, each radiator of a pair of radiators is tapered in width in a direction toward an extremity of the radiator, the taper being definable by straight edges of the radiator having an angle there between of less than 90 degrees. In some embodiments, each radiator of a pair of radiators has a rounded tab portion at an extremity of the radiator. In some embodiments, one or more of the set of four radiators is tilted away from the plane. In some embodiments, a radiator and a corresponding ground strip or signal strip is stamped or cut from a flat piece of metal to form one unitary piece. In some embodiments, straight edges of radiators have a flange to strengthen the radiator. In some embodiments, a radiator has a ridge along a center of the radiator to strengthen the radiator. In some embodiments, a distal end of a radiator is bent away from a plane of the radiator.

According to another aspect, an antenna structure is provided. A radiator structure has a first two oppositely directed radiators forming a first radiator pair and has a second two oppositely directed radiators forming a second radiator pair. The first radiator pair is oriented 90 degrees from the second radiator pair. Each radiator in the first radiator pair is adjacent to a radiator in the second radiator pair. The radiator structure has a central area and each radiator in a pair has an extremity furthest away from the central area of the antenna structure. A fence structure situated about the radiator structure has wall portions that are higher in some areas of the fence structure than in other areas of the fence structure.

According to this aspect, in some embodiments, the higher wall portions are positioned in proximity to but away from corners of the fence structure, the corners of the fence structure corresponding to the extremities of the radiators. In some embodiments, wall portions of the fence structure in proximity to the corners taper in height toward the corners to a height that is lower than the higher wall portions. In some embodiments, wall portions between the higher wall portions have a height that is less than half a height of the higher wall portions. In some embodiments, the higher wall portions are positioned in first areas to reduce mutual coupling between adjacent antenna structures as compared to mutual coupling resulting from having lower wall portions in the first areas, and lower wall portions are positioned in second areas to reduce cross polarization between adjacent antenna structures as compared to cross polarization resulting from having higher wall portions in the second areas. In some embodiments, lower wall portions have wall height of zero.

According to yet another aspect, an antenna element is provided. The antenna element includes a radiator having a feed point and an extremity, the radiator tapering in width along a length extending from the feed point to the extremity, the extremity being a furthest distance from the feed point. The antenna element also includes a feed strip or a ground strip extending from the radiator and having a flat surface. The first feed strip or ground strip is bendable at an angle from the radiator to form one conductor of a balanced transmission line. The antenna element also includes a flange on each of two sides of the radiator, each flange having a flat surface and being at an angle from the radiator.

According to this aspect, in some embodiments, the extremity has a rounded tab portion to achieve a wider bandwidth as compared to a bandwidth achievable were the extremity to end in a point. The rounded tab portion may have an area that is optimized to minimize the coupling for a given element spacing while achieving the desired impedance match for a specific bandwidth of operation for which the antenna element is designed. In some embodiments, the radiator, feed strip or ground strip and the flanges are cut or stamped from a same piece of metal to form an integral part consisting of one piece. In some embodiments, the feed strip is dimensioned to have a length that is up to a quarter wavelength (typically between 0.2 and 0.25 times a wavelength) at a predetermined frequency in a bandwidth of operation for which the antenna element is designed. In some embodiments, the radiator is tapered in width in a direction toward the extremity, the taper being definable by straight edges of the radiator having an angle there between of less than 90 degrees.

According to one aspect, an antenna for a wireless communication device is provided. The antenna includes a radiator structure having a set of four radiators, each radiator located within a different one of four quadrants of a plane, two radiators, of the set being within diagonally opposite quadrants to form a first pair of radiators and another two radiators of the set being within diagonally opposite quadrants to form a second pair of radiators. The antenna also includes a first ground strip configured to connect a first radiator of the first pair of radiators to a ground conductor and a first signal strip configured to connect a second radiator of the first pair of radiators to a first terminal, the first ground strip and the first signal strip being oriented with respect to each other to form a first balanced transmission line. The antenna also includes a second ground strip configured to connect a first radiator of the second pair of radiators to the ground conductor and a second signal strip configured to connect a second radiator of the second pair of radiators to a second terminal, the second ground strip and the second signal strip being oriented with respect to each other to form a second balanced transmission line.

According to this aspect, in some embodiments, the first signal strip and the first ground strip have flat surfaces oriented to face and be parallel to each other when oriented to form the first balanced transmission line, and the second signal strip and the second ground strip have flat surfaces oriented to face and be parallel to each other when oriented to form the second balanced transmission line. In some embodiments, the first signal strip and the first ground strip each have a first length orientable to be perpendicular to the plane, and wherein the second signal strip and the second ground strip each have a second length oriented to be perpendicular to the plane. In some embodiments, each radiator has multiple edges, each of two edges of the multiple edges having a flange facing a flange of an adjacent radiator, each flange extending away from the plane, the facing flanges providing mutual coupling of signals between adjacent radiators. In some embodiments, the first terminal is connected to a source or receiver of an RF signal and the second terminal is connected to a source or receiver of an RF signal. In some embodiments, each radiator of a pair of radiators is tapered in width in a direction toward an extremity of the radiator, the taper being definable by straight edges of the radiator having an angle there between of not more than 90 degrees. In some embodiments, each radiator of a pair of radiators has a tab portion at an extremity of the radiator. In some embodiments, the tab of the radiator is bent through an angle with respect to a plane of the radiator. In some embodiments, each radiator of a pair of radiators has an extremity that is bent through an angle with respect to the plane of the radiator. In some embodiments, the tab of the radiator is bent through an angle with respect to a plane of the radiator. In some embodiments, each radiator of a pair of radiators has an extremity that is bent through an angle with respect to the plane of the radiator. In some embodiments, one or more of the set of four radiators is tilted away from the plane. In some embodiments, a radiator and a corresponding ground strip or signal strip is stamped or cut from a flat piece of metal to form one unitary piece. In some embodiments, the unitary piece is configured to have at least one opening therethrough. In some embodiments, a radiator is configured to have at least one opening therethrough. In some embodiments, straight edges of radiators have a brim. In some embodiments, a radiator has a ridge along a center of the radiator.

According to another aspect, an antenna structure includes a radiator structure having a first two oppositely directed radiators forming a first radiator pair and having a second two oppositely directed radiators forming a second radiator pair, the first radiator pair being oriented 90 degrees from the second radiator pair, each radiator in the first radiator pair being adjacent to a radiator in the second radiator pair, the radiator structure having a central area and each radiator in a pair having an extremity furthest away from the central area of the antenna structure. The antenna structure also includes a fence structure situated about the radiator structure, the fence structure having wall portions, each wall portion being one of uniform in height and non-uniform in height along a length of the wall portion.

According to this aspect, in some embodiments, oppositely facing wall portions of the fence structure are each non-uniform in height along a length of the wall portion and are each mirror images of each other. In some embodiments, the fence structure has four sides and a wall portion has higher wall portions in proximity to but away from corners of the fence structure, the corners of the fence structure corresponding to the extremities of the radiators. In some embodiments, one set of oppositely facing wall portions has a different height distribution than the other set of oppositely facing wall portions. In some embodiments, wall portions of the fence structure include higher wall portions in proximity to corners of the fence structure, the higher wall portions tapering in height toward the corners to a height that is lower than a maximum height of the higher wall portions. In some embodiments, wall portions between the higher wall portions have a height that is less than a height of the higher wall portions. In some embodiments, the higher wall portions are positioned in first areas to reduce mutual coupling between adjacent antenna structures as compared to mutual coupling resulting from having lower wall portions in the first areas, and lower wall portions are positioned in second areas to reduce cross polarization between adjacent antenna structures as compared to cross polarization resulting from having higher wall portions in the second areas. In some embodiments, lower wall portions of a wall portion of the fence structure have wall height of zero.

According to yet another aspect, an antenna element includes a radiator having a feed point and an extremity, the radiator tapering in width along a length extending from the feed point to the extremity, the extremity being a furthest distance from the feed point. The antenna element also includes a feed strip or ground strip extending from the radiator and having a flat surface, the first feed strip or ground strip being bendable at an angle from the radiator to form one conductor of a balanced transmission line. The antenna element also includes a flange 18 on each of two sides of the radiator, each flange having a flat surface and being at an angle from the radiator.

According to this aspect, in some embodiments, the extremity has a tab portion to achieve a wider bandwidth as compared to a bandwidth achievable were the extremity to end in a point. In some embodiments, the radiator, feed strip or ground strip and the flanges are cut or stamped from a same piece of metal to form an integral part consisting of one piece. In some embodiments, the feed strip is dimensioned to have a length that is up to a quarter wavelength at a frequency in a bandwidth of operation for which the antenna element is designed. In some embodiments, the radiator is tapered in width in a direction toward the extremity, the taper being definable by straight edges of the radiator having an angle there between of not more than 90 degrees.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
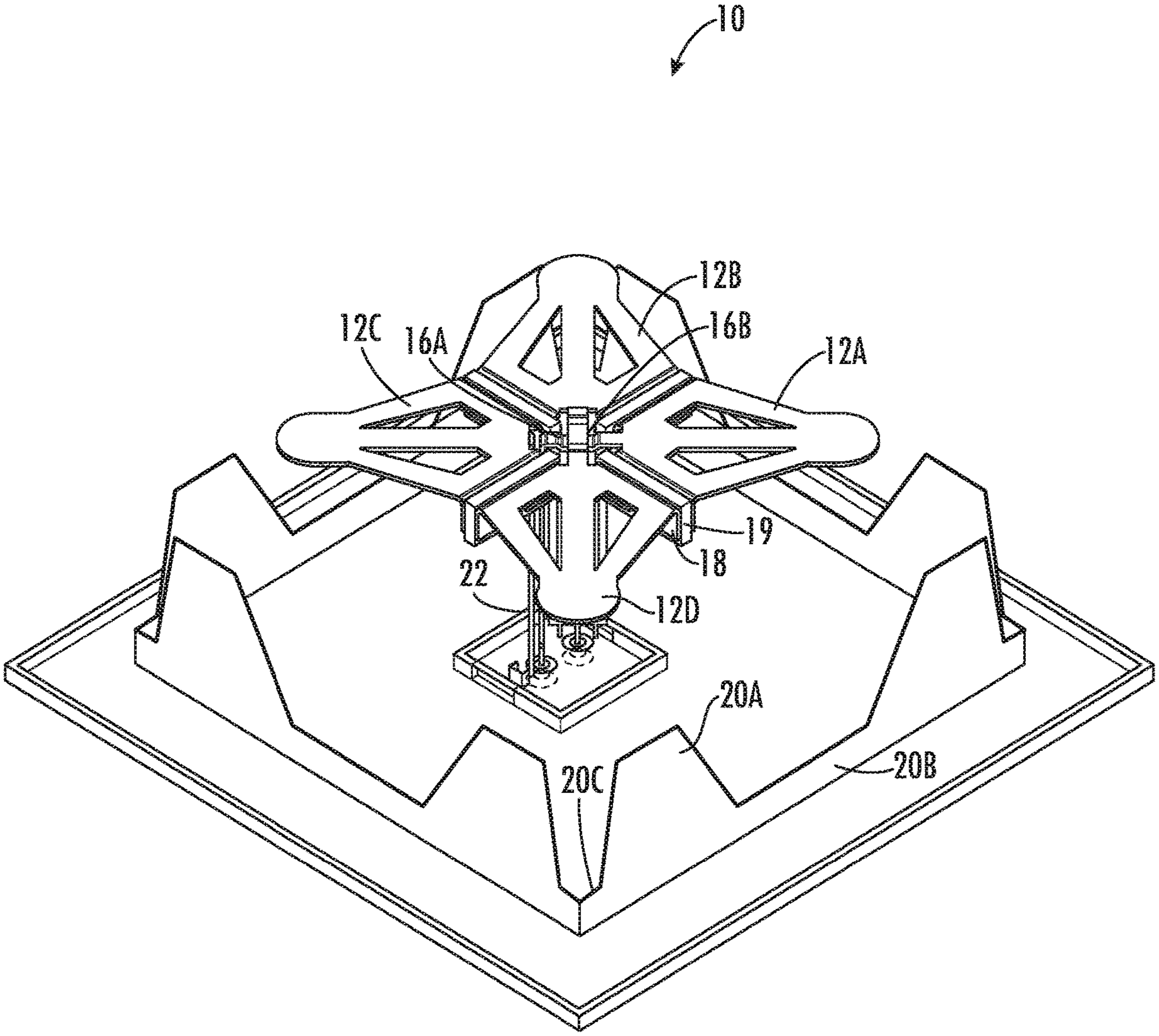
FIG. 1 illustrates an antenna structure for use in an array of antennas.

Before describing in detail exemplary embodiments, it is noted that the embodiments reside primarily in combinations of apparatus components and processing steps related to antenna structures, antennas and antenna elements for large antenna arrays. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements.

Figure 2:
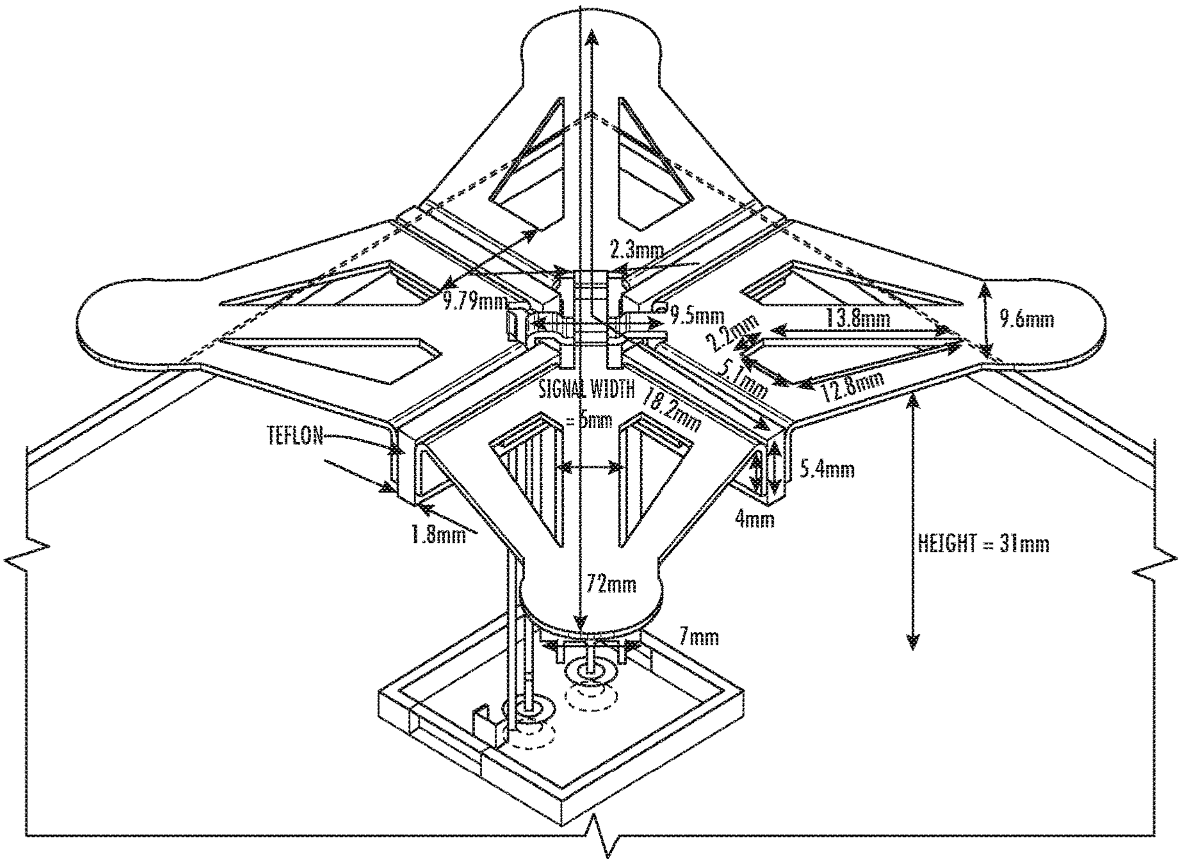
FIG. 2 illustrates the antenna structure dimensions for an example antenna designed to operate in a frequency band that includes a frequency range of 1.71 to 2.2 Giga Hertz.
Figure 3:
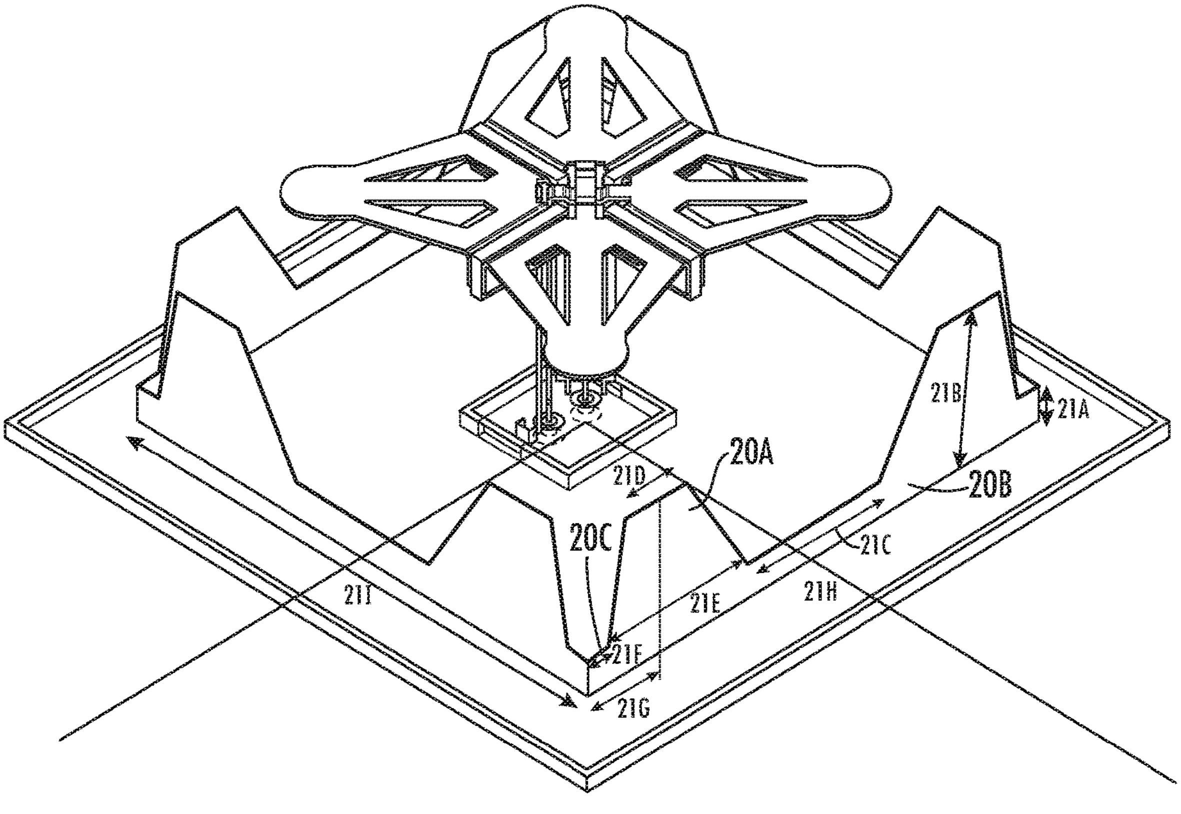
FIG. 3 illustrates dimensions of a fence structure.

Referring now to the drawing figures in which like reference numerals denote like elements, an antenna structure 10 shown in FIGS. 1-3 incorporates an all metal symmetric radiator design having four identical petal shapes 12A, 12B, 12C and 12D, referred to collectively herein as radiators 12. Each radiator 12 is located within a different quadrant of a plane above which the radiators lie. Two radiators 12A and 12C lie within diagonally opposite quadrants to form a first pair of radiators. Two radiators 12B and 12D also lie within the other two diagonally opposite quadrants to form a second pair of radiators. In some embodiments, the first and second pair of radiators may create two orthogonal polarization components in a dual polarized antenna.

In the central area between the radiators 12 are a first coupling strip 16A connecting radiator 12A to a first feeder strip coupled to a signal source via of a feed and ground structure 22 and a second coupling strip 16B connecting radiator 12D to a second feeder strip coupled to a second signal source via the feed and ground structure 22. Note that the first coupling strip 16A is situated under the second coupling strip 16B and the two coupling strips 16A and 16B do not touch each other. Details of the feed and ground structure are discussed in more detail below.

Each radiator 13 has a brim or flange 18 on each of two sides of a radiator for coupling to adjacent neighboring radiators. The gap between the flanges 18 of two adjacent radiators may be filled by a dielectric insert 19. At a periphery of the antenna structure 10 is a fence 20 having high walls 20A and low walls 20B on a broadside of the structure between the high walls 20A. Low walls 20C are located in the corners of the fence 20.

FIG. 2 illustrates an example of an antenna structure, showing the antenna structure dimensions for an antenna designed to operate in a frequency band that includes a frequency range of 1.71 to 2.2 Giga Hertz. It is noted that the dimensions shown in FIG. 2 are merely examples used to show one possible embodiment to support the above-referenced frequency. It is understood that not all implementations should or need to use any or all of these dimensions, and that embodiments are in no way limited to the dimensions or the corresponding scale shown in FIG. 2.

FIG. 3 illustrates the fence designed to operate in the same frequency band as the antenna structure of FIG. 2. The dimensions of the walls of the fence, and width and length of the fence are given in Table 1. These dimensions are examples only as may be chosen to accommodate a bandwidth of operation that includes a frequency range of 1.71 to 2.2 GHz. In other words, the data shown in Table 1 are non-limiting examples of but one embodiment. Implementations are not limited to the dimensions in Table 1. Note that walls of the fence may be shared between adjacent antenna structures 10.

TABLE 1

| Reference Numeral | Dimension (in millimeters) |
|---|---|
| 21A | 5 |
| 21B | 21 |
| 21C | 22 |
| 21D | 10 |
| 21E | 23 |
| 21F | 3.55 |
| 21G | 11.55 |
| 21H | 97 |
| 21I | 75 |

Note the high walls 20A near the corners, and the low walls 20B on each broadside of the structure between the high walls 20A, and the high walls 20A tapering down to low walls 20C in the corners of the fence. Note that in some embodiments, some or all of the low walls 20B and/or 20C may be absent, i.e., having a height of zero. In some embodiments, as shown in FIG. 3, the low walls 20B and/or 20C have a height that is less than half the height of the high walls 20A. In some embodiments, the high walls 20A may be positioned to reduce mutual coupling between adjacent antenna structures that would otherwise exist if the walls were lower. The low walls 20B and/or 20C may be positioned to reduce cross polarization between adjacent antenna structures that would otherwise exist if the walls were higher. Thus, there may be a tradeoff between raising the walls to reduce mutual coupling and lowering the walls to reduce cross polarization. The heights of the walls in the different areas around the antenna structure to achieve an optimum tradeoff may be determined by experimentation or by numerical simulations. The experimentation may be performed by successive runs of an electromagnetic simulation computer program or by successive tests of different structures in an anechoic chamber, for example.

Figure 4:
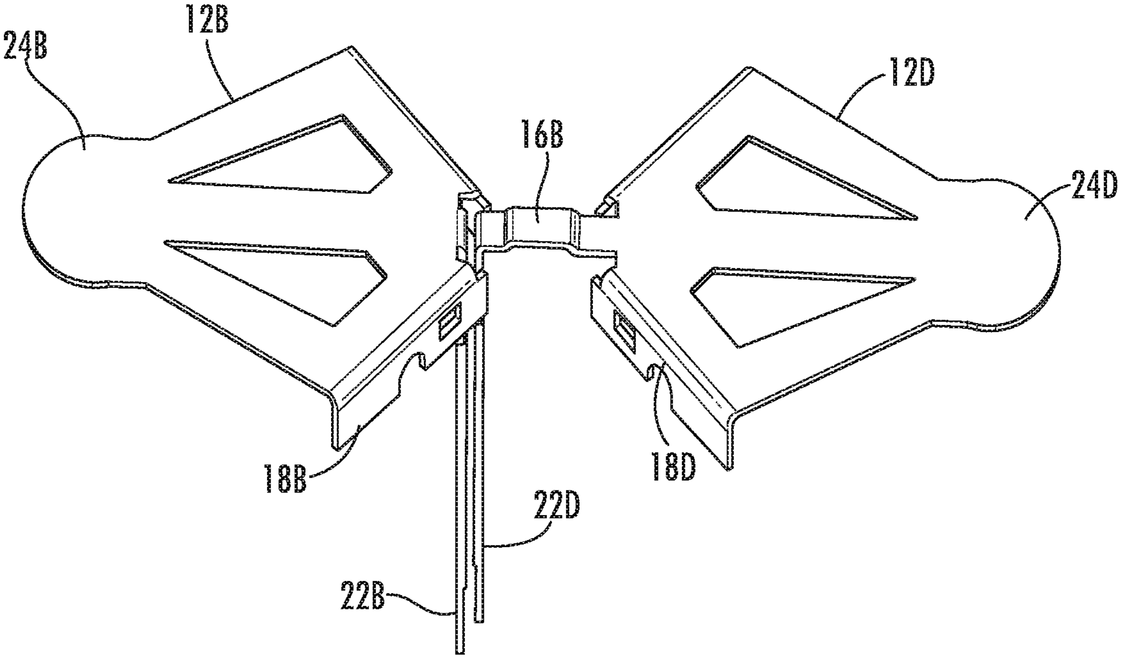
FIG. 4 illustrates a first pair of diagonally opposite resonators.

FIG. 4 is a drawing of the pair of radiators 12B and 12D oriented as they would be within the antenna structure of FIG. 1. Each radiator 12B and 12D may end in a point or may include a tab portion 24B and 24D, respectively, that is rounded in order to increase the bandwidth that would otherwise be achieved if the radiator 12B, 12D ended in a point. In some embodiments, the tab portion may have an area that is optimized to minimize the coupling for a given element spacing while achieving a desired impedance match for a specific bandwidth of operation for which the antenna element is designed. Each radiator 12B and 12D have a flange 18B and 18D, respectively on each side of the radiator 12B and 12D. The wider the flange 18B, 18D, the stronger the mutual coupling between adjacent radiators of the same antenna structure 10. The mutual coupling helps increase the bandwidth of matched impedance of the radiators. However, a wider flange can result in mismatch of the antenna. The flange width is a parameter that can be tuned (adjusted) to meet performance requirements of the antenna.

Radiator 12D has a first coupling strip 16B that connects the radiator 12D to a first feed strip 22D that exhibits a flat surface facing a flat surface of a ground strip 22B that is connected to radiator 12B. The ground strip 22B and the first feed strip 22D form a balanced transmission line without the need for a balun. The ground strip 22B connects to a ground conductor located beneath the radiators 12B and 12D. The first feed strip connects to a signal source located beneath the radiators 12B and 12D through a hole, i.e., opening, in the ground conductor. In some embodiments, the height of the radiators 12B and 12D, and consequently the approximate length of the ground strip 22B and feed strip 22D, is up to a quarter wavelength, typically 0.2 to 0.25 times a wavelength, at a frequency in a bandwidth of operation for which the antenna element is designed. In some embodiments, the approximate length of the ground strip 22B and feed strip 22D may be greater than a quarter wavelength.

Figure 5:
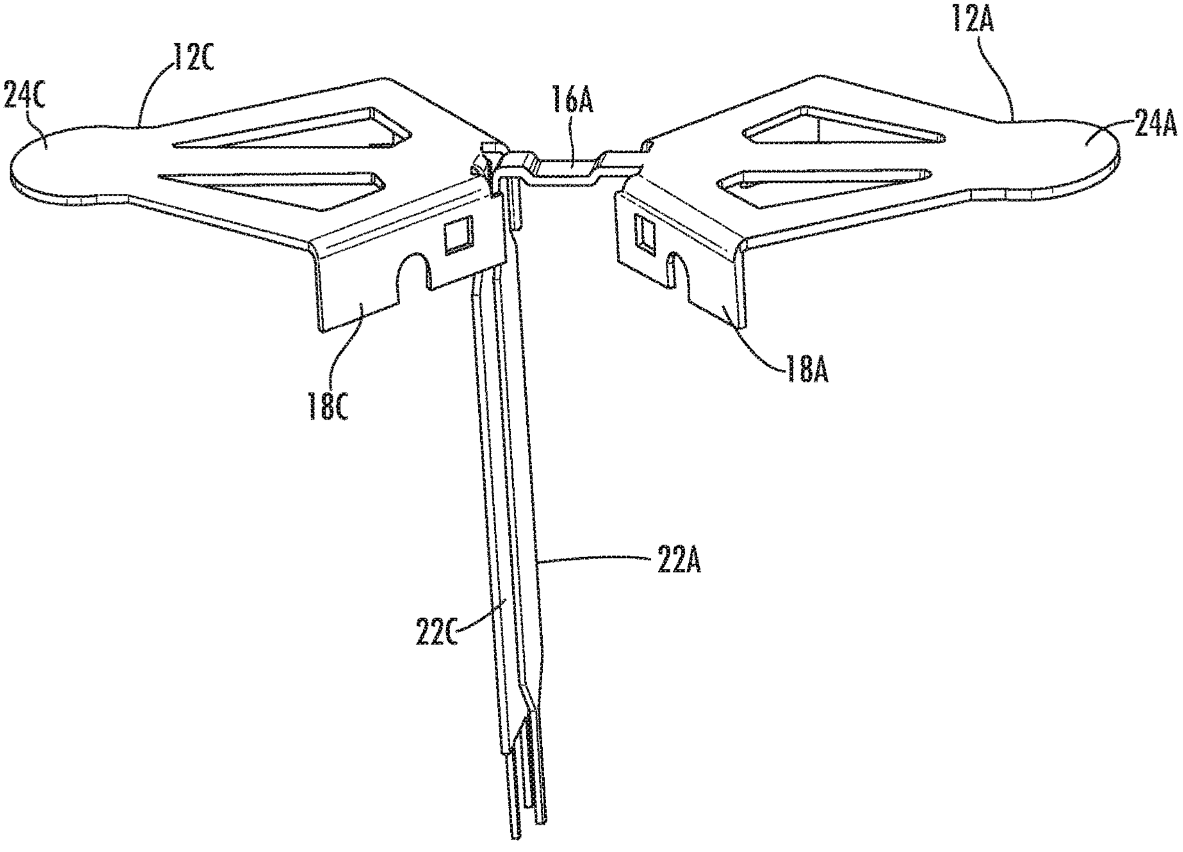
FIG. 5 illustrates a second pair of diagonally opposite resonators.

FIG. 5 is a drawing of the pair of radiators 12A and 12C oriented as they would be within the antenna structure of FIG. 1. Each radiator 12A and 12C includes a tab portion 24A and 24C (collectively referred to as tab portion 24), respectively, that is rounded in order to increase the bandwidth that would otherwise be achieved if the radiator 12A, 12C ended in a point. In some embodiments, the tab portion has an area that is based on frequency within a bandwidth of operation for which the antenna element is designed. In some embodiments, the shape of the tab portion 24 could be square, octagonal or other shape. Each radiator 12A and 12C has flanges 18A and 18C, respectively on each side of the radiator 12A and 12C. The wider the flange 18A, 18C, the stronger the mutual coupling between adjacent radiators.

Radiator 12A has a has first coupling strip 16A that connects the radiator 12A to a first feed strip 22A that exhibits a flat surface facing a flat surface of a ground strip 22C that is connected to radiator 12C. The ground strip 22C and the first feed strip 22A form a balanced transmission line without the need for a balun. The ground strip 22C connects to a ground conductor located beneath the radiators 12A and 12C. The first feed strip connects to a signal source located beneath the radiators 12A and 12C through a hole, i.e., opening, in the ground conductor. In some embodiments, the height of the radiators 12A and 12C, and consequently the approximate length of the ground strip 22C and feed strip 22A, is up to a quarter wavelength, typically 0.2 to 0.25 times a wavelength, at a predetermined frequency in a bandwidth of operation for which the antenna element is designed.

Figure 6:
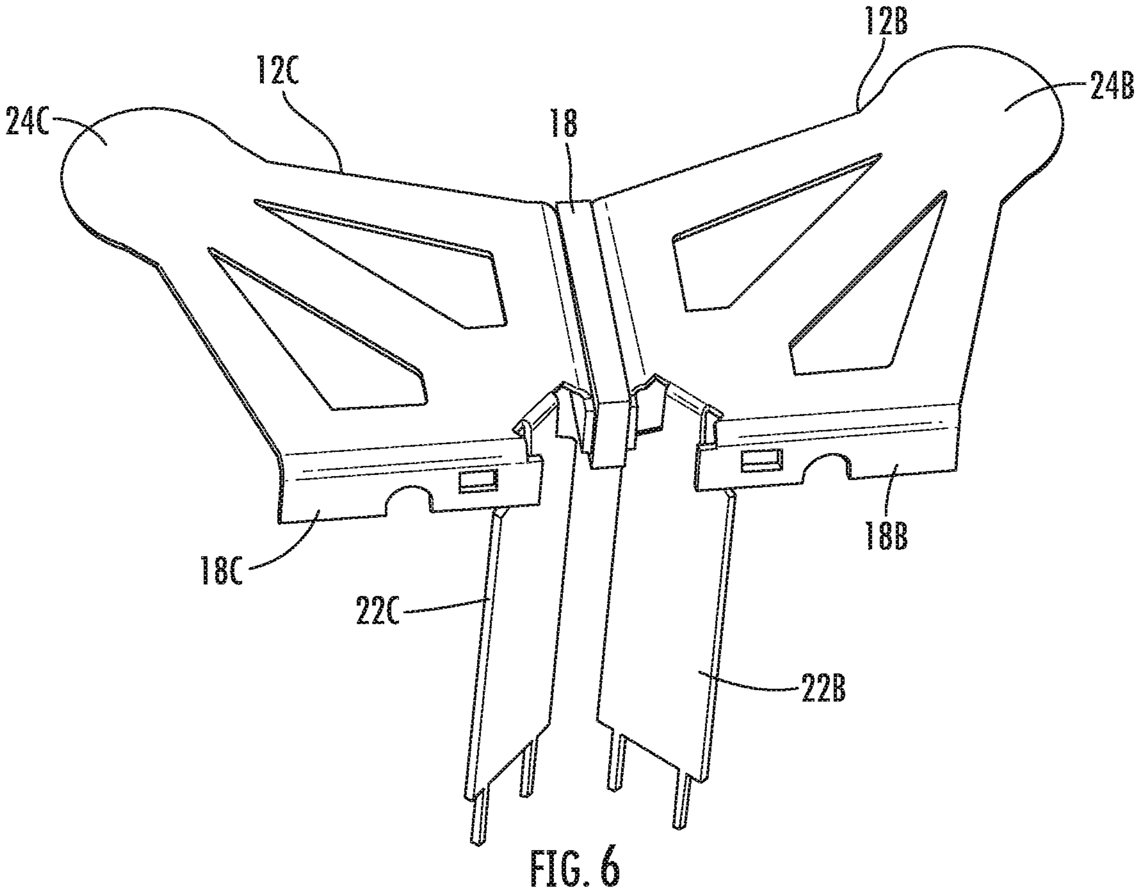
FIG. 6 illustrates a first pair of adjacent resonators.

FIG. 6 shows adjacent radiators 12B and 12C separated by the dielectric insert 18 and connected to ground strips 22B and 22C.

Figure 7:
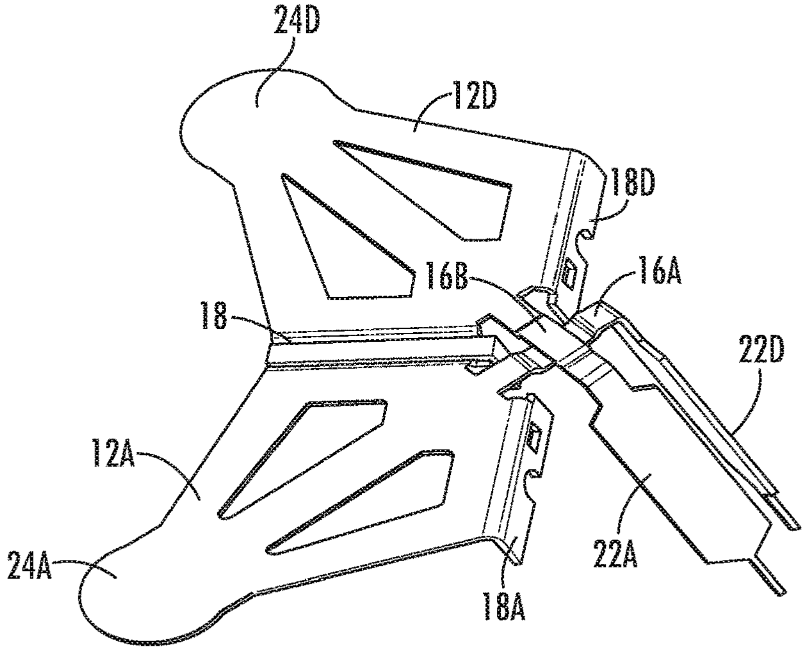
FIG. 7 illustrates a second pair of adjacent resonators.

FIG. 7 shows adjacent radiators 12A and 12D separated by a different dielectric 18 and connected to coupling strips 16A and 16B which connect to feed strips 22A and 22D, respectively.

Figure 8:
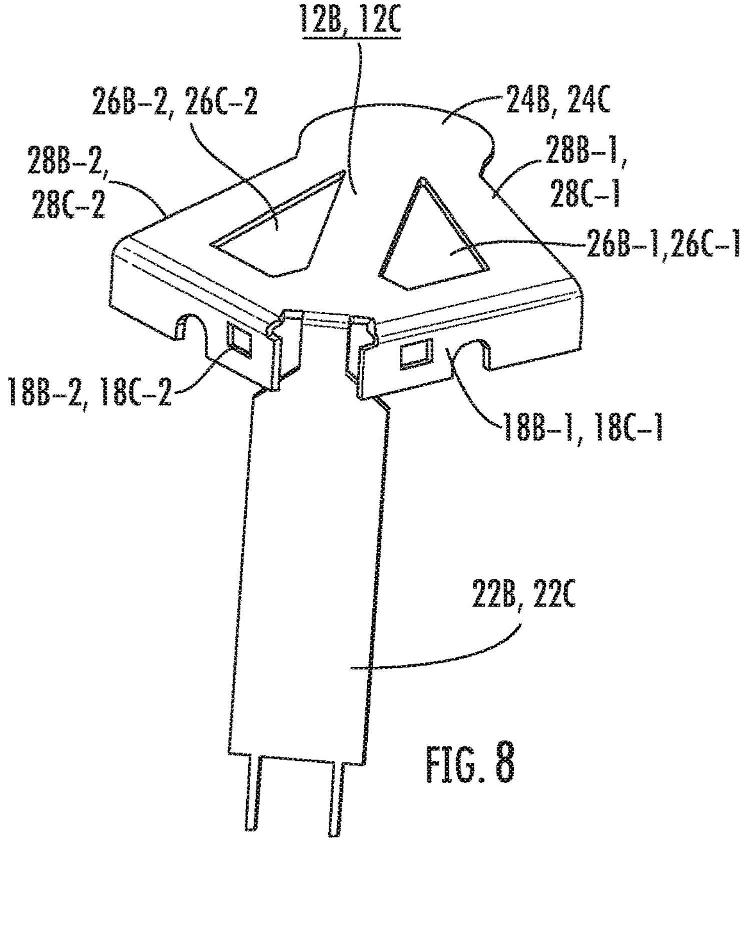
FIG. 8 illustrates a first radiator with feed structure.

FIG. 8 shows a single radiator which may be radiator 12B or 12C, having a ground strip 22B or 22C, respectively. The radiator 12B, 12C has flanges 18B-1, 18C-1 and 18B-2, 18C-2, respectively. The radiator 12B, 12C has holes 26B-1, 26C-1 and 26B-2, 26C-2, respectively, to reduce the weight of the radiator 12B, 12C. Also, the geometry of the holes, i.e., openings, affects the antenna matching and thus impedance bandwidth. Further, the radiator 12B, 12C exhibits edges 28B-1, 28C-1 and 28B-2, 28C-2 which form an angle of less than 90 degrees to reduce mutual coupling that would otherwise be present if the angle were 90 degrees or greater. The reduced angle may also result in lighter weight. In some embodiments, the angle may be less than 45 degrees.

Figure 9:
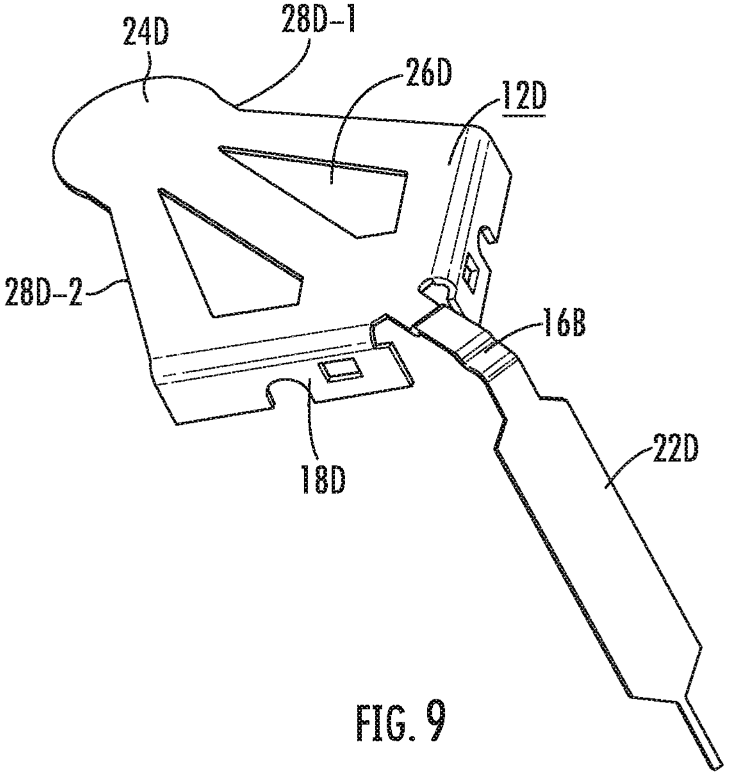
FIG. 9 illustrates a second radiator with feed structure.
Figure 10:
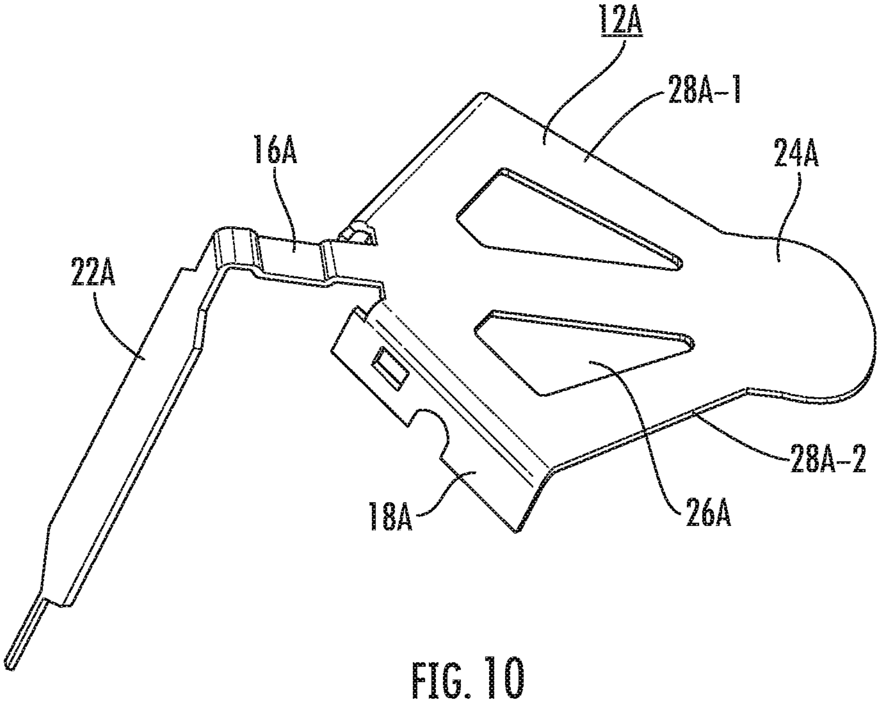
FIG. 10 illustrates a third radiator with feed structure.

FIG. 9 shows the radiator 12D and FIG. 10 shows the radiator 12A. The difference between radiators 12A and 12D is that the coupling strip 16B of radiator 12D is configured to be above the coupling strip 16A of radiator 12A. The radiator 12A exhibit edges 28A-1 and 28A-2 that form an angle of less than 90 degrees to reduce mutual coupling that would otherwise be present if the angle were 90 degrees or greater. The reduced angle may also result in lighter weight. Similarly, the radiator 12D exhibit edges 28D-1 and 28D-2 that form an angle of less than 90 degrees to reduce mutual coupling that would otherwise be present if the angle were 90 degrees or greater. Thus, the shapes of the radiators 12 are tapered in width in a direction toward the tab portion 24, the taper being definable by straight edges 28 of the radiator having an angle there between of less than 90 degrees. In some embodiments, the angle there between can be 90 degrees, so the angle does not exceed 90 degrees. Note that in some embodiments, edges 28 can be curvilinear, rather than straight.

Note that radiators 12A, 12B, 12C and 12D and associated ground/feed strips 22 can each be one piece cut or stamped from a flat piece of metal and then bent to create the ground/feed strips 22 and the flanges 18.

Thus, two adjacent radiators 12B and 12C may each have a ground strip 22B and 22C, respectively, connecting the radiator to the radiator ground conductor below the radiators 12B and 12C. The other two adjacent radiators 12A and 12D may each have a feeder strip 22A and 22D, respectively, connecting the radiator to the radiator input signal through a hole, i.e., opening, in the ground conductor located beneath the radiators 12A and 12D.

The ground and feeder strips 22 for two diagonally opposite radiators 12, such as radiators 12A and 12C, or radiators 12B and 12D, form a transmission line (broadside coupled stripline) to feed their respective radiators. The broadside coupled transmission line structure is balanced and therefore a balun is not needed, which simplifies the feed structure. Each radiator pair (12A, 12C) and (12B, 12D) radiates and receives a different polarization. The coupling strips 16A and 16B cross each other at the center area between the radiators with one going over and one going under at the crossing point. In some embodiments, the height of the radiators above the ground plane may be approximately up to a quarter wavelength, typically 0.2 to 0.25 times a wavelength, at a frequency of operation of the antenna. In some embodiments, an optional low loss dielectric spacer 19 may be employed for precise mechanical alignment of the radiators 12. Other RF transparent mechanical structures can be used to provide precise mechanical alignment and support without affecting the electromagnetic performance of the radiator.

Figure 11:
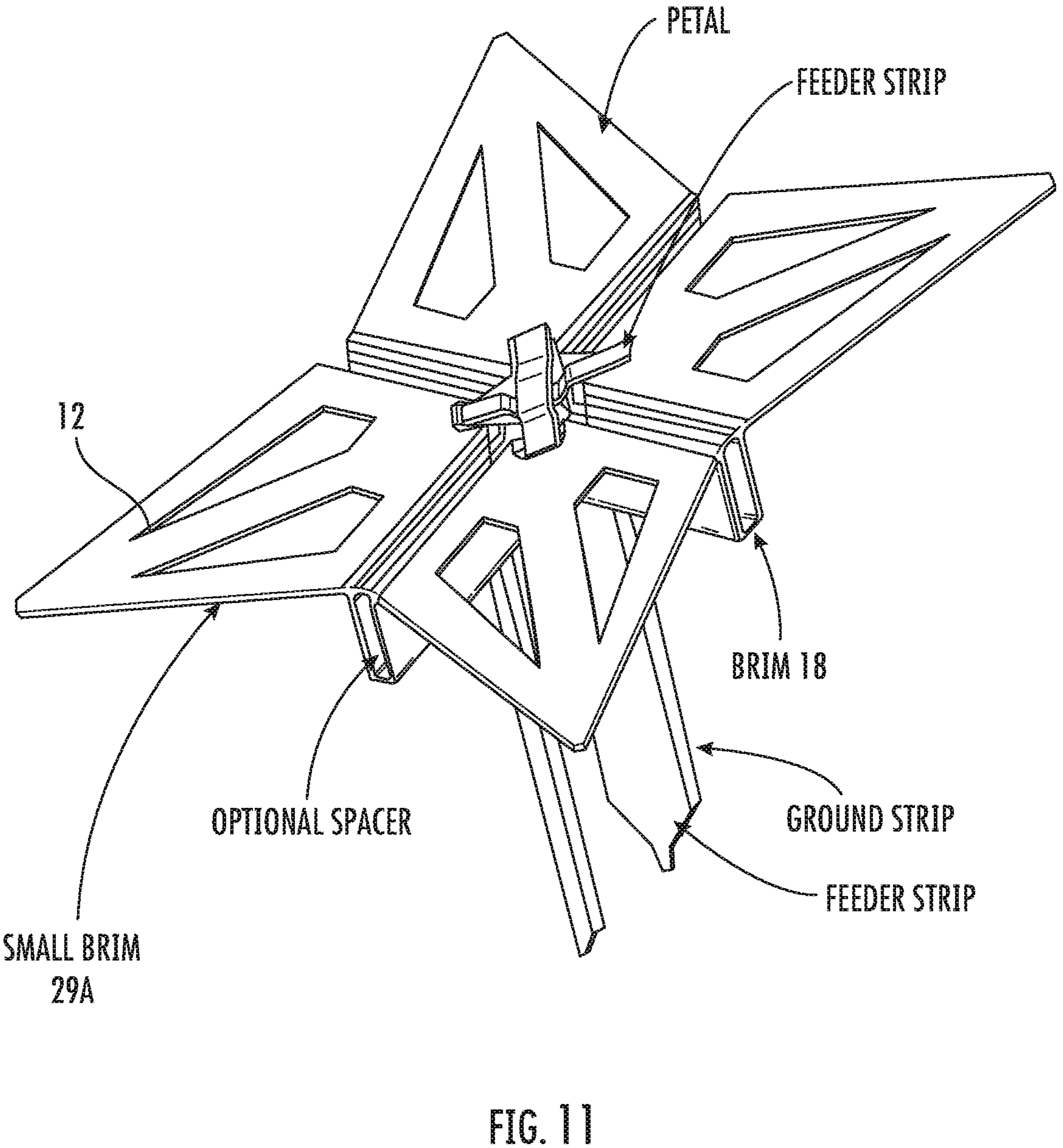
FIG. 11 illustrates an embodiment with a small flange or brim at edges of the radiators.

FIG. 11 illustrates an embodiment wherein a radiator 12 has a small brim or flange 29A at each edge of the radiator 12. This flange strengthens the physical structure of the radiator 12 and allows for thinner metal to be used to construct the radiator 12, thereby reducing weight. Note that the small flange 29A-1 is smaller than flange 18 between radiators.

Figure 12:
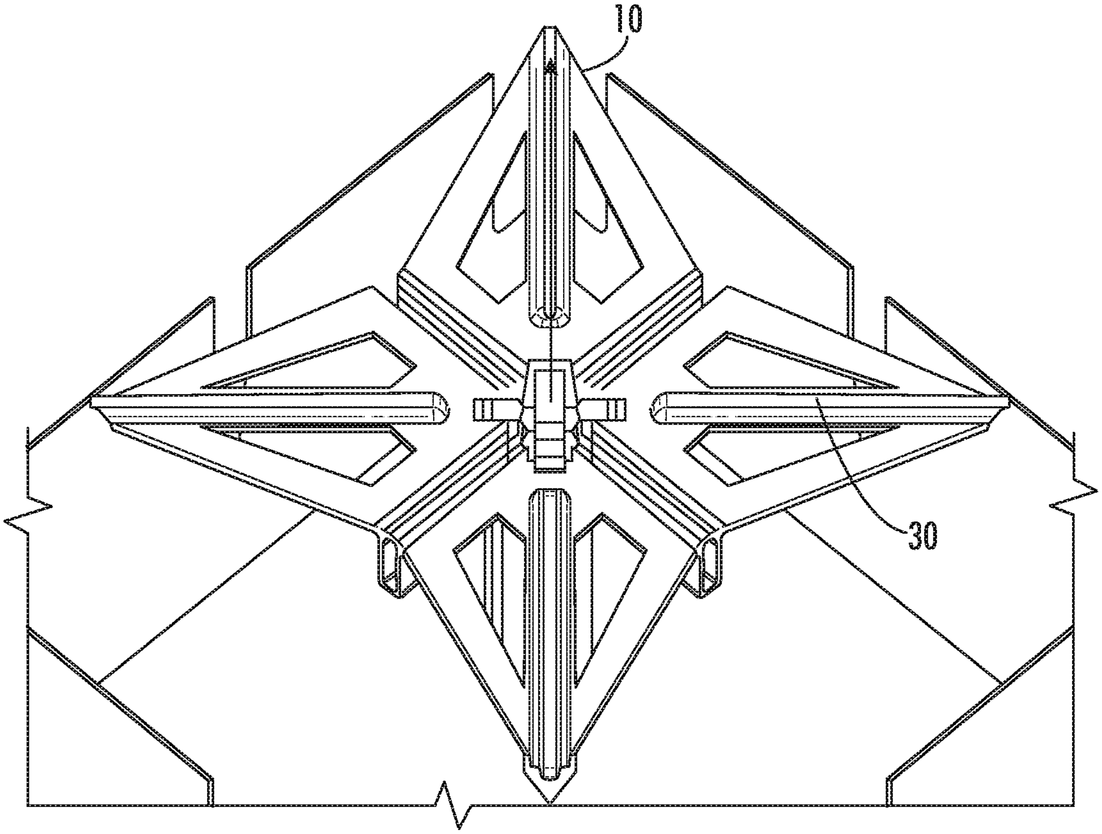
FIG. 12 illustrates an embodiment with a ridge along the center of each radiator.
Figure 13:
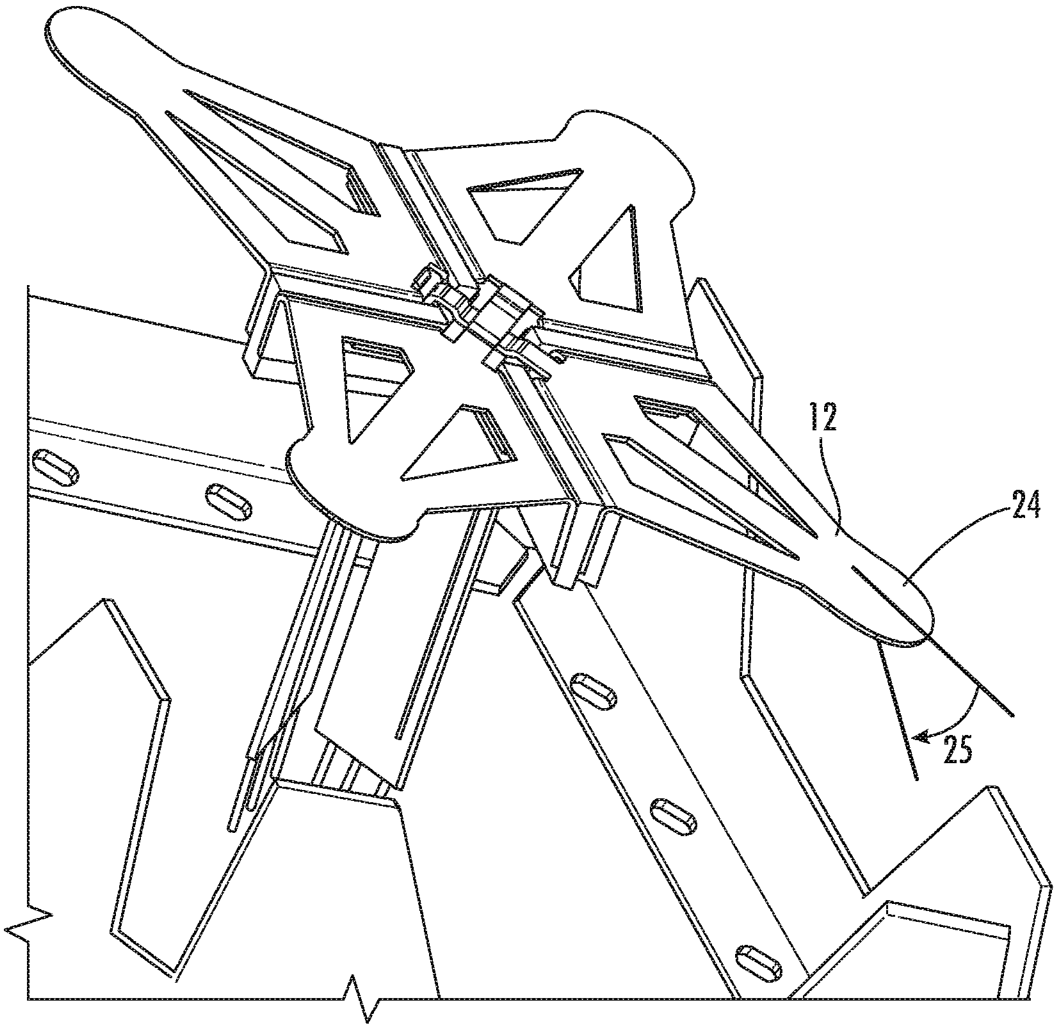
FIG. 13 illustrates an embodiment wherein a tab region may be bent to reduce a footprint of a radiator.

FIG. 12 illustrates an embodiment wherein a ridge 30 is placed along each radiator equidistant from the straight edges that extend away from the center of the antenna element 10. The ridge 30 is a raised portion that may be stamped into sheet metal forming the radiator to stiffen the radiator so that it can be made of thinner metal, thereby reducing weight. FIG. 13 illustrates an embodiment of an antenna element wherein a tab 24 or tip of the radiator 12 may be bent downward through an angle 25, for example up to 90 degrees, to reduce a footprint of the radiator 12.

Figure 14:
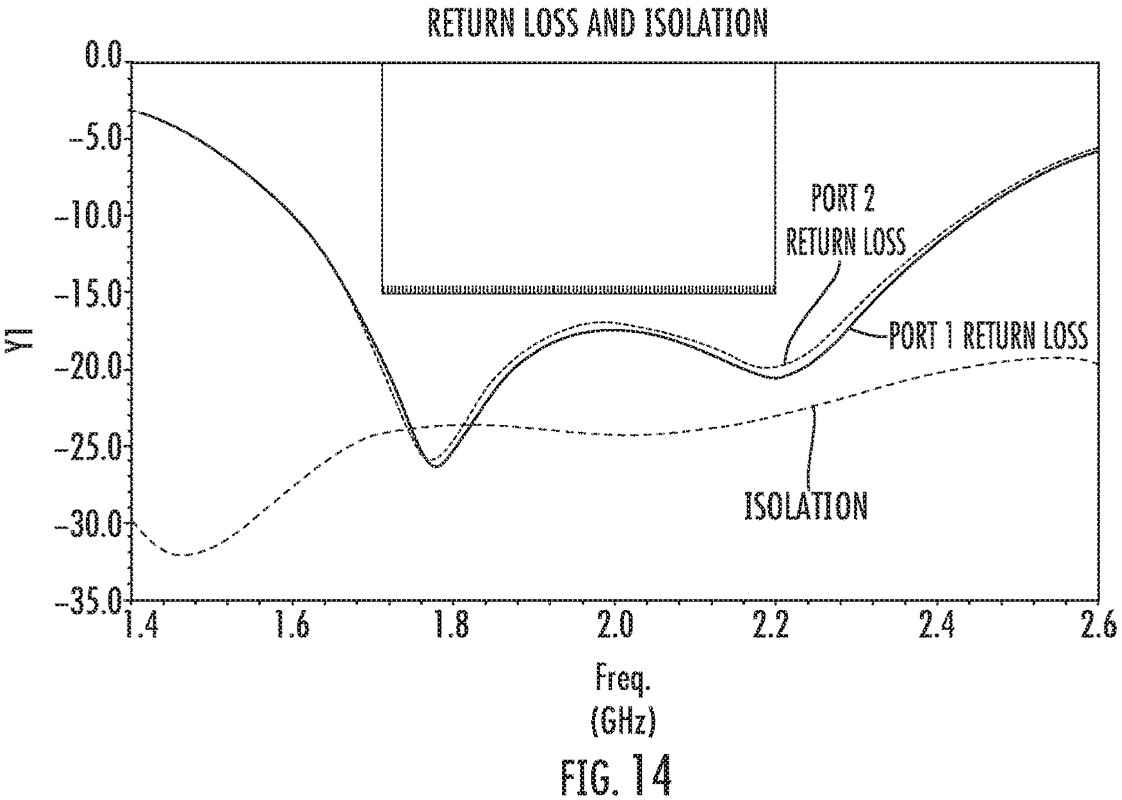
FIG. 14 illustrates return loss and isolation characteristics of an antenna structure constructed in accordance with principles set forth herein.
Figure 15:
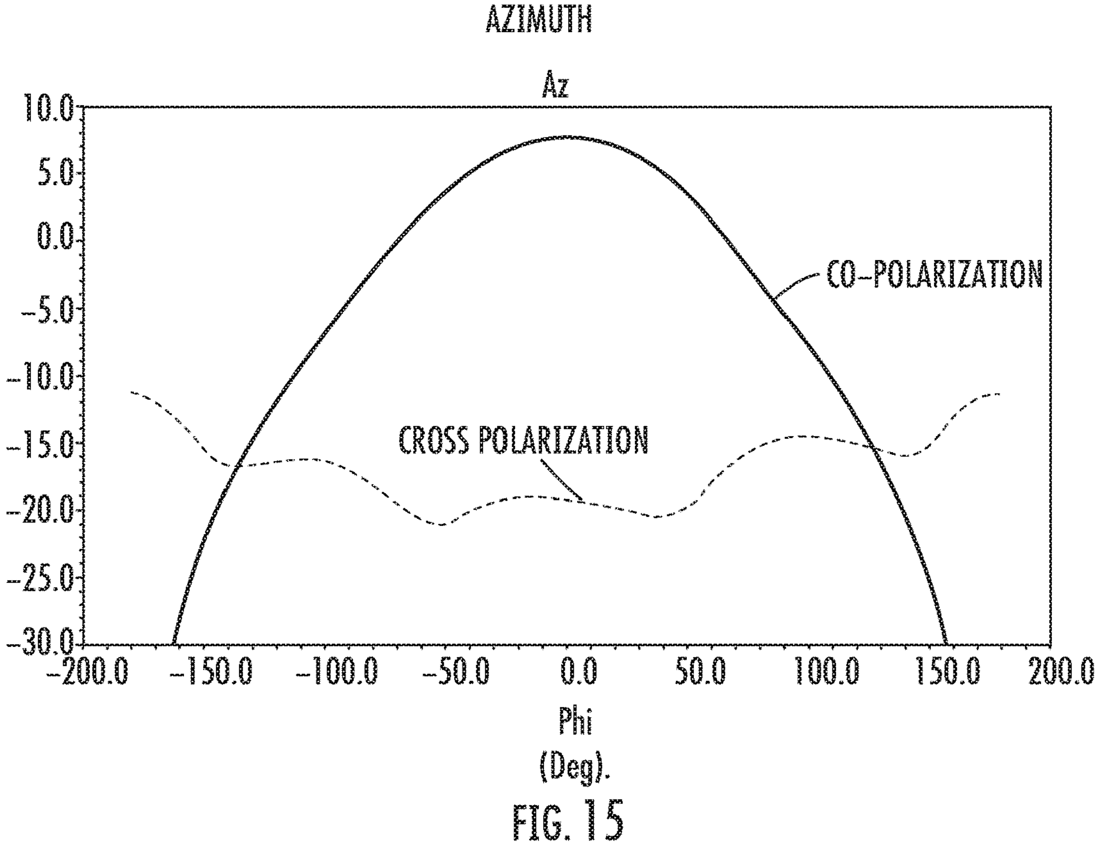
FIG. 15 illustrates performance as a function of azimuth angle.
Figure 16:
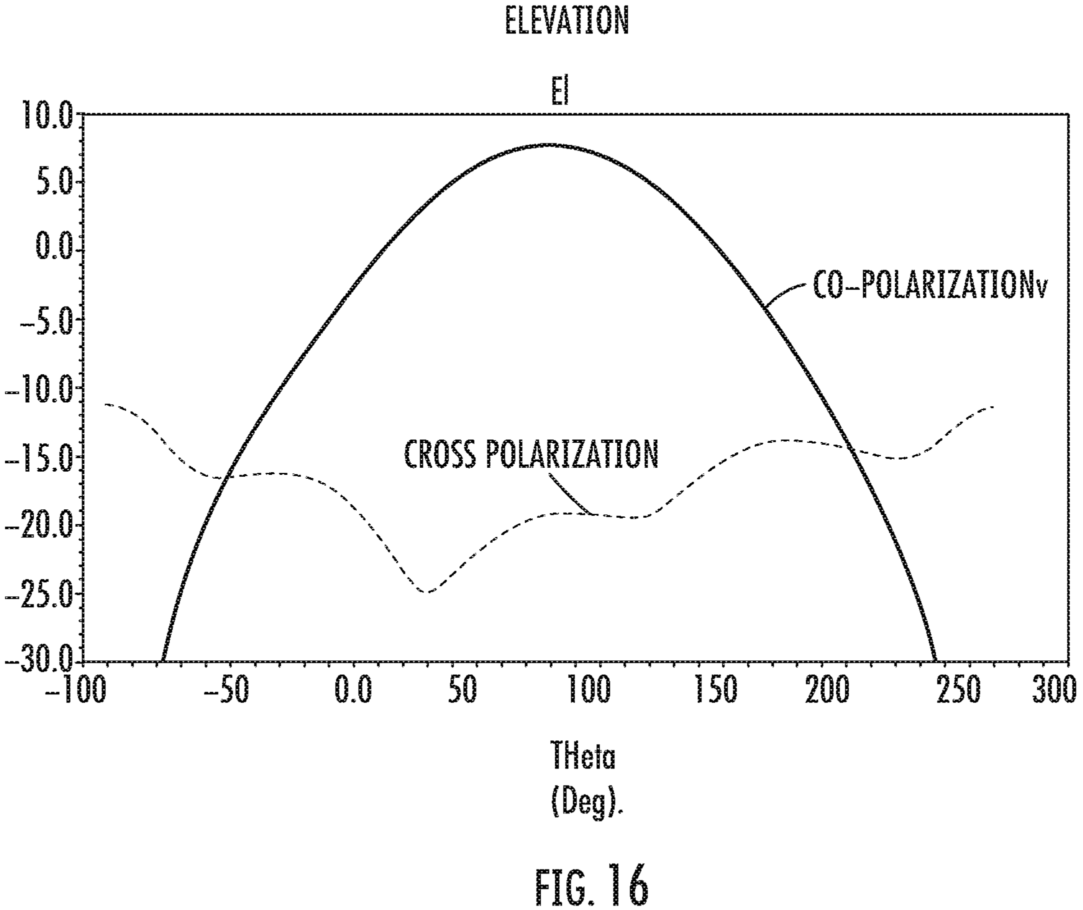
FIG. 16 illustrates performance as a function of elevation angle.

FIG. 14 is a graph showing an example of the return loss and isolation characteristics between ports of adjacent radiators of an antenna structure constructed in accordance with principles set forth herein. In particular, the return loss is less than −15 dB over a frequency range from 1.71 to 2.2 Giga Hertz. FIGS. 15 and 16 are graphs showing radiation patterns as a function of azimuth angle and elevation angle, respectively. For example, co-polarization 3 dB beamwidth is 90 degrees, while cross polarization remains more than 20 dB lower than the co-polarization.

According to one aspect, an antenna for a wireless communication device is provided. The antenna includes a radiator structure having a set of four radiators 12, each radiator 12 located within a different one of four quadrants of a plane, two radiators 12A, 12C of the set being within diagonally opposite quadrants to form a first pair of radiators and another two radiators 12B, 12D of the set being within diagonally opposite quadrants to form a second pair of radiators. The antenna also includes a first ground strip 22C configured to connect a first radiator 12C of the first pair of radiators to a ground conductor and a first signal strip 22A configured to connect a second radiator 12A of the first pair of radiators 12 to a first terminal, the first ground strip 22C and the first signal strip 22A being oriented with respect to each other to form a first balanced transmission line. The antenna also includes a second ground strip 22B configured to connect a first radiator 12B of the second pair of radiators 12 to the ground conductor and a second signal strip 22D configured to connect a second radiator 12D of the second pair of radiators 12 to a second terminal, the second ground strip 22B and the second signal strip 22D being oriented with respect to each other to form a second balanced transmission line.

According to this aspect, in some embodiments, the first signal strip 22A and the first ground strip 22C have flat surfaces oriented to face and be parallel to each other when oriented to form the first balanced transmission line, and the second signal strip 22D and the second ground strip 22B have flat surfaces oriented to face and be parallel to each other when oriented to form the second balanced transmission line. In some embodiments, the first signal strip 22A and the first ground strip 22C each have a first length oriented to be perpendicular to the plane, and wherein the second signal strip 22D and the second ground strip 22B each have a second length oriented to be perpendicular to the plane. In some embodiments, each radiator 12 has multiple edges, each of two edges of the multiple edges having a flange 18 facing a flange 18 of an adjacent radiator 12, each flange 18 extending away from the plane, the facing flanges 18 providing mutual coupling of signals between adjacent radiators 12. In some embodiments, the first terminal is connected to a first source or receiver of an RF signal and the second terminal is connected to a second source or receiver of an RF signal. In some embodiments, each radiator 12 of a pair of radiators is tapered in width in a direction toward an extremity of the radiator 12, the taper being definable by straight edges 28 of the radiator having a first angle there between of not more than 90 degrees. In some embodiments, each radiator 12 of a pair of radiators has a tab portion 24 at an extremity of the radiator 12. In some embodiments, the tab of the radiator 12 is bent through a second angle with respect to a plane of the radiator 12. In some embodiments, each radiator 12 of a pair of radiators has an extremity that is bent through a third angle with respect to the plane of the radiator. In some embodiments, one or more of the set of four radiators 12 is tilted away from the plane. In some embodiments, a radiator 12 and a corresponding ground strip or signal strip 22 is stamped or cut from a flat piece of metal to form one unitary piece. In some embodiments, the unitary piece is configured to have at least one opening therethrough. In some embodiments, a radiator 12 is configured to have at least one opening therethrough. In some embodiments, straight edges 28 of radiators 12 have a flange 29A the radiator 12. In some embodiments, a radiator 12 has a ridge (30) along a center of the radiator 12.

According to another aspect, an antenna structure includes a radiator structure having a first two oppositely directed radiators 12A, 12C forming a first radiator pair and having a second two oppositely directed radiators 12B, 12D forming a second radiator pair, the first radiator pair being oriented 90 degrees from the second radiator pair, each radiator 12 in the first radiator pair being adjacent to a radiator 12 in the second radiator pair, the radiator structure having a central area and each radiator 12 in a pair having an extremity furthest away from the central area of the antenna structure. The antenna structure also includes a fence structure 20 situated about the radiator structure, the fence structure 20 having wall portions 20A, each wall portion being one of uniform in height and non-uniform in height along a length of the wall portion.

According to this aspect, in some embodiments, oppositely facing wall portions of the fence structure 20 are each non-uniform in height along a length of the wall portion and are each mirror images of each other. In some embodiments, the fence structure 20 has four sides and a wall portion has higher wall portions 20A in proximity to but away from corners of the fence structure 20, the corners of the fence structure 20 corresponding to the extremities of the radiators. In some embodiments, one set of oppositely facing wall portions has a different height distribution than the other set of oppositely facing wall portions. In some embodiments, wall portions of the fence structure 20 include higher wall portions 20A in proximity to corners of the fence structure 20, the higher wall portions tapering in height toward the corners to a height that is lower than a maximum height of the higher wall portions 20A. In some embodiments, wall portions 20B between the higher wall portions 20A have a height that is less than a height of the higher wall portions 20A. In some embodiments, the higher wall portions 20A are positioned in first areas to reduce mutual coupling between adjacent antenna structures as compared to mutual coupling resulting from having lower wall portions in the first areas, and lower wall portions 20B, 20C are positioned in second areas to reduce cross polarization between adjacent antenna structures as compared to cross polarization resulting from having higher wall portions in the second areas. In some embodiments, lower wall portions 20B, 20C of a wall portion of the fence structure 20 have wall height of zero.

According to yet another aspect, an antenna element includes a radiator 12 having a feed point and an extremity, the radiator 12 tapering in width along a length extending from the feed point to the extremity, the extremity being a furthest distance from the feed point. The antenna element also includes a feed strip or ground strip 22 extending from the radiator 12 and having a flat surface, the first feed strip or ground strip 22 being bent at a first angle from the radiator 12 to form one conductor of a balanced transmission line. The antenna element also includes a flange 18 on each of two sides of the radiator 12, each flange 18 having a flat surface and being at a second angle from the radiator 12.

According to this aspect, in some embodiments, the extremity has a tab portion 24 to achieve a wider bandwidth as compared to a bandwidth achievable were the extremity to end in a point. In some embodiments, the radiator 12, feed strip or ground strip 22 and the flanges 18 are cut or stamped from a same piece of metal to form an integral part consisting of one piece. In some embodiments, the feed strip 22 is dimensioned to have a length that is up to a quarter wavelength at a frequency in a bandwidth of operation for which the antenna element is designed. In some embodiments, the radiator 12 is tapered in width in a direction toward the extremity, the taper being definable by straight edges 28 of the radiator 12 having a third angle there between of not more than 90 degrees.

Thus, according to one aspect, an antenna includes a radiator structure 10 having a set of four radiators 12, each radiator 12 located within a different one of four quadrants of a plane. Two of the four radiators 12 of the set are within diagonally opposite quadrants to form a first pair of radiators 12A, 12C, and another two radiators 12 of the set are within diagonally opposite quadrants to form a second pair of radiators 12B, 12D. A first ground strip 22C is configured to connect a first radiator 12C of the first pair of radiators to a ground conductor and a first signal strip 22A is configured to connect a second radiator 12A of the first pair of radiators to a first terminal. The first ground strip 22C and the first signal strip 22A are orientable in proximity to each other to form a first balanced transmission line. A second ground strip 22B is configured to connect a first radiator 12B of the second pair of radiators to the ground conductor and a second signal strip 22D is configured to connect a second radiator 12D of the second pair of radiators to a second terminal. The second ground strip 22B and the second signal strip 22D are orientable in proximity to each other to form a second balanced transmission line.

According to this aspect, in some embodiments, the first signal strip 22A and the first ground strip 22C have flat surfaces orientable to face and be parallel to each other when oriented to form the first balanced transmission line, and the second signal strip 22D and the second ground strip 22B have flat surfaces orientable to face and be parallel to each other when oriented to form the second balanced transmission line. In some embodiments, the first signal strip 22A and the first ground strip 22C each have a first length orientable to be perpendicular to the plane, and wherein the second signal strip 22D and the second ground strip 22B each have a second length orientable to be perpendicular to the plane. In some embodiments, each radiator 12 has multiple edges, each of two edges 28 of the multiple edges having a flange 18 facing a flange 18 of an adjacent radiator, each flange 18 extending away from the plane, the facing flanges 18 providing mutual coupling of signals between adjacent radiators 12. In some embodiments, the first terminal is connected to a source or receiver of an RF signal and the second terminal is connected to a source or receiver of an RF signal. In some embodiments, each radiator 12A, 12C or 12B, 12D of a pair of radiators 12 is tapered in width in a direction toward an extremity of the radiator 12, the taper being definable by straight edges 28 of the radiator 12 having an angle there between of less than 90 degrees. In some embodiments, each radiator 12 of a pair of radiators has a tab portion 24 at an extremity of the radiator 12. In some embodiments, one or more of the set of four radiators 12 is tilted away from the plane. In some embodiments, a radiator 12 and a corresponding ground strip 22 or signal strip 22 is stamped or cut from a flat piece of metal to form one unitary piece. In some embodiments, straight edges 28 of radiators 12 have a flange 29A to strengthen the radiator 12. In some embodiments, a radiator 12 has a ridge 30 along a center of the radiator 12 to strengthen the radiator 12. In some embodiments, a distal end tab portion 24 of a radiator 12 is bent away from a plane of the radiator 12.

According to another aspect, an antenna structure is provided. A radiator structure has a first two oppositely directed radiators 12 forming a first radiator pair 12A, 12C and has a second two oppositely directed radiators 12 forming a second radiator pair 12B, 12D. The first radiator pair 12A, 12C is oriented 90 degrees from the second radiator pair 12B, 12D. Each radiator 12 in the first radiator pair 12A, 12C is adjacent to a radiator 12 in the second radiator pair 12B, 12D. The radiator structure has a central area and each radiator 12 in a pair has an extremity furthest away from the central area of the antenna structure. A fence structure 20 situated about the radiator structure has wall portions 20A that are higher in some areas of the fence structure 20 than in other areas of the fence structure 20.

According to this aspect, in some embodiments, the higher wall portions 20A are positioned in proximity to but away from corners of the fence structure 20, the corners of the fence structure 20 corresponding to the extremities of the radiators 12. In some embodiments, wall portions of the fence structure 20 in proximity to the corners taper in height toward the corners to a height that is lower than the higher wall portions 20A. In some embodiments, wall portions 20B between the higher wall portions 20A have a height that is less than half a height of the higher wall portions 20A. In some embodiments, the higher wall portions 20A are positioned in first areas to reduce mutual coupling between adjacent antenna structures 10 as compared to mutual coupling resulting from having lower wall portions in the first areas, and lower wall portions 20B are positioned in second areas to reduce cross polarization between adjacent antenna structures as compared to cross polarization resulting from having higher wall portions in the second areas. In some embodiments, lower wall portions 20B and or 20C, have wall height of zero. In some embodiments, a first set of parallel walls have a height that is greater than a height of a second set of parallel walls. According to yet another aspect, an antenna element is provided. The antenna element includes a radiator 12 having a feed point and an extremity, the radiator 12 tapering in width along a length extending from the feed point to the extremity, the extremity being a furthest distance from the feed point. The antenna element also includes a feed strip or a ground strip 22 extending from the radiator 12 and having a flat surface. The first feed strip or ground strip 22 is bendable at an angle from the radiator 12 to form one conductor of a balanced transmission line. The antenna element also includes a flange 18 on each of two sides of the radiator 12, each flange 18 having a flat surface and being at an angle from the radiator 12.

According to this aspect, in some embodiments, the extremity has a tab portion 24 to achieve a wider bandwidth as compared to a bandwidth achievable were the extremity to end in a point. The rounded tab portion 24 may have an area that is optimized to minimize the coupling for a given element spacing while achieving the desired impedance match for a specific bandwidth of operation for which the antenna element is designed. In some embodiments, the radiator 12, feed strip or ground strip 22 and the flanges 18 are cut or stamped from a same piece of metal to form an integral part consisting of one piece. In some embodiments, the feed strip 22 is dimensioned to have a length that is up to at least a quarter wavelength, typically 0.2 to 0.25 times a wavelength, at a predetermined frequency in a bandwidth of operation for which the antenna element is designed. In some embodiments, the radiator 12 is tapered in width in a direction toward the extremity, the taper being definable by straight edges of the radiator 12 having an angle there between of less than 90 degrees.

Some embodiments include the following:

Embodiment 1. An antenna for a wireless communication device, the antenna comprising:

- a radiator structure having a set of four radiators (12), each radiator (12) located within a different one of four quadrants of a plane, two radiators (12A, 12C) of the set being within diagonally opposite quadrants to form a first pair of radiators and another two radiators (12B, 12D) of the set being within diagonally opposite quadrants to form a second pair of radiators;
- a first ground strip (22C) configured to connect a first radiator (12C) of the first pair of radiators to a ground conductor and a first signal strip (22A) configured to connect a second radiator (12A) of the first pair of radiators (12) to a first terminal, the first ground strip (22C) and the first signal strip (22A) being orientable in proximity to each other to form a first balanced transmission line; and
- a second ground strip (22B) configured to connect a first radiator (12B) of the second pair of radiators (12) to the ground conductor and a second signal strip (22D) configured to connect a second radiator (12D) of the second pair of radiators (12) to a second terminal, the second ground strip (22B) and the second signal strip (22D) being orientable in proximity to each other to form a second balanced transmission line.

Embodiment 2. The antenna of Embodiment 1, wherein the first signal strip (22A) and the first ground strip (22C) have flat surfaces orientable to face and be parallel to each other when oriented to form the first balanced transmission line, and the second signal strip (22D) and the second ground strip (22B) have flat surfaces orientable to face and be parallel to each other when oriented to form the second balanced transmission line.

Embodiment 3. The antenna of any of Embodiments 1 and 2, wherein the first signal strip (22A) and the first ground strip (22C) each have a first length orientable to be perpendicular to the plane, and wherein the second signal strip (22D) and the second ground strip (22B) each have a second length orientable to be perpendicular to the plane.

Embodiment 4. The antenna of any of Embodiments 1-3, wherein each radiator (12) has multiple edges, each of two edges of the multiple edges having a flange (18) facing a flange (18) of an adjacent radiator (12), each flange (18) extending away from the plane, the facing flanges (18) providing mutual coupling of signals between adjacent radiators (12).

Embodiment 5. The antenna of any of Embodiments 1-4, wherein the first terminal is connected to a source or receiver of an RF signal and the second terminal is connected to a source or receiver of an RF signal.

Embodiment 6. The antenna of any of Embodiments 1-5, wherein each radiator (12) of a pair of radiators is tapered in width in a direction toward an extremity of the radiator (12), the taper being definable by straight edges (28) of the radiator having an angle there between of less than 90 degrees.

Embodiment 7. The antenna of any of Embodiments 1-6, wherein each radiator (12) of a pair of radiators has a tab portion (24) at an extremity of the radiator (12).

Embodiment 8. The antenna of any of Embodiments 1-7, wherein one or more of the set of four radiators (12) is tilted away from the plane.

Embodiment 9. The antenna of any of Embodiments 1-8, wherein a radiator (12) and a corresponding ground strip or signal strip (22) is stamped or cut from a flat piece of metal to form one unitary piece.

Embodiment 10. The antenna of any of Embodiments 1-9, wherein straight edges (28) of radiators (12) have a flange (29A) to strengthen the radiator (12).

Embodiment 11. The antenna of any of Embodiments, 1-10, wherein a radiator (12) has a ridge (30) along a center of the radiator (12) to strengthen the radiator (12).

Embodiment 12. The antenna of any of Embodiments 1-12, wherein a distal end (24) of a radiator 12 is bent away from a plane of the radiator (12).

Embodiment 13. An antenna structure, comprising: a radiator structure having a first two oppositely directed radiators (12A, 12C) forming a first radiator pair and having a second two oppositely directed radiators (12B, 12D) forming a second radiator pair, the first radiator pair being oriented 90 degrees from the second radiator pair, each radiator (12) in the first radiator pair being adjacent to a radiator (12) in the second radiator pair, the radiator structure having a central area and each radiator (12) in a pair having an extremity furthest away from the central area of the antenna structure; and a fence structure (20) situated about the radiator structure, the fence structure (20) having wall portions (20A) that are higher in some areas of the fence structure (20) than in other areas of the fence structure (20).

Embodiment 14. The antenna structure of Embodiment 13, wherein the higher wall portions (20A) are positioned in proximity to but away from corners of the fence structure (20), the corners of the fence structure (20) corresponding to the extremities of the radiators.

Embodiment 15. The antenna structure of Embodiment 14, wherein wall portions of the fence structure (20) in proximity to the corners taper in height toward the corners to a height that is lower than the higher wall portions (20A).

Embodiment 16. The antenna structure of any of Embodiments 13-15, wherein wall portions (20B) between the higher wall portions (20A) have a height that is less than half a height of the higher wall portions (20A).

Embodiment 17. The antenna structure of any of Embodiments 13-16, wherein the higher wall portions (20A) are positioned in first areas to reduce mutual coupling between adjacent antenna structures as compared to mutual coupling resulting from having lower wall portions in the first areas, and lower wall portions (20B, 20C) are positioned in second areas to reduce cross polarization between adjacent antenna structures as compared to cross polarization resulting from having higher wall portions in the second areas.

Embodiment 18. The antenna structure of any of Embodiments 13-17, wherein lower wall portions (20B, 20C) have wall height of zero.

Embodiment 19. The antenna structure of Embodiment 13, wherein a first set of parallel walls have a height that is greater than a height of a second set of parallel walls.

Embodiment 20. An antenna element, the antenna element comprising:

a radiator (12) having a feed point and an extremity, the radiator (12) tapering in width along a length extending from the feed point to the extremity, the extremity being a furthest distance from the feed point;

a feed strip or ground strip (22) extending from the radiator (12) and having a flat surface, the first feed strip or ground strip (22) being bendable at an angle from the radiator (12) to form one conductor of a balanced transmission line; and a flange (18) on each of two sides of the radiator (12), each flange (18) having a flat surface and being at an angle from the radiator (12).

Embodiment 21. The antenna element of Embodiment 20, wherein the extremity has a tab portion (24) to achieve a wider bandwidth as compared to a bandwidth achievable were the extremity to end in a point.

Embodiment 22. The antenna element of any of Embodiments 20 and 21, wherein the radiator (12), feed strip or ground strip (22) and the flanges (18) are cut or stamped from a same piece of metal to form an integral part consisting of one piece.

Embodiment 23. The antenna element of any of Embodiments 20-22, wherein the feed strip (22) is dimensioned to have a length that is up to a quarter wavelength at a frequency in a bandwidth of operation for which the antenna element is designed.

Embodiment 24. The antenna element of any of Embodiments 20-23, wherein the radiator (12) is tapered in width in a direction toward the extremity, the taper being definable by straight edges (28) of the radiator (12) having an angle there between of less than 90 degrees.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An antenna for a wireless communication device, the antenna comprising:

a radiator structure having a set of four radiators, each radiator located within a different one of four quadrants of a plane, two radiators of the set being within diagonally opposite quadrants to form a first pair of radiators, and another two radiators of the set being within diagonally opposite quadrants to form a second pair of radiators;

a first ground strip configured to connect a first radiator of the first pair of radiators to a ground conductor;

a first signal strip configured to connect a second radiator of the first pair of radiators to a first terminal, the first ground strip and the first signal strip being oriented with respect to each other to form a first balanced transmission line;

a second ground strip configured to connect a first radiator of the second pair of radiators to the ground conductor; and a second signal strip configured to connect a second radiator of the second pair of radiators to a second terminal, the second ground strip and the second signal strip being oriented with respect to each other to form a second balanced transmission line.

2. The antenna of claim 1, wherein the first signal strip and the first ground strip have flat surfaces oriented to face and be parallel to each other when oriented to form the first balanced transmission line, and the second signal strip and the second ground strip have flat surfaces oriented to face and be parallel to each other when oriented to form the second balanced transmission line.

3. The antenna of claim 1, wherein the first signal strip and the first ground strip each have a first length oriented to be perpendicular to the plane, and wherein the second signal strip and the second ground strip each have a second length oriented to be perpendicular to the plane.

4. The antenna of claim 1, wherein each radiator has multiple edges, each of two edges of the multiple edges having a flange facing another flange of an adjacent radiator, the flange and the other flange extending away from the plane, the flange and the other flange providing mutual coupling of signals between adjacent radiators.

5. The antenna of claim 1, wherein the first terminal is connected to one of a first source and receiver of an RF signal, and the second terminal is connected to one of a second source and receiver of an RF signal.

6. The antenna of claim 1, wherein each radiator of a pair of radiators is tapered in width in a direction toward an extremity of the radiator, the taper being definable by straight edges of the radiator having an angle there between of not more than 90 degrees.

7. The antenna of claim 1, wherein each radiator of a pair of radiators has a tab portion at an extremity of the radiator.

8. The antenna of claim 7, wherein the tab portion of the radiator is bent through an angle with respect to a plane of the radiator.

9. The antenna of claim 1, wherein each radiator of a pair of radiators has an extremity that is bent through an angle with respect to the plane of the radiator.

10. The antenna of claim 1, wherein one or more of the set of four radiators is tilted away from the plane.

11. The antenna of claim 1, wherein a radiator and one of a corresponding ground strip and signal strip is one of stamped and cut from a flat piece of metal to form one unitary piece.

12. The antenna of claim 11, wherein the unitary piece is configured to have at least one opening therethrough.

13. The antenna of claim 1, wherein a radiator is configured to have at least one opening therethrough.

14. The antenna of claim 1, wherein straight edges of radiators have a brim.

15. The antenna of claim 1, wherein a radiator has a ridge along a center of the radiator.

16. An antenna structure, comprising:

a radiator structure having a first two oppositely directed radiators forming a first radiator pair and having a second two oppositely directed radiators forming a second radiator pair, the first radiator pair being oriented 90 degrees from the second radiator pair, each radiator in the first radiator pair being adjacent to a radiator in the second radiator pair, the radiator structure having a central area and each radiator in a pair having an extremity furthest away from the central area of the antenna structure; and a fence structure situated about the radiator structure, the fence structure having wall portions, each wall portion being one of uniform in height and non-uniform in height along a length of the wall portion.

17. The antenna structure of claim 16, wherein oppositely facing wall portions of the fence structure are each non-uniform in height along a length of the wall portion and are each mirror images of each other.

18. The antenna structure of claim 16, wherein the fence structure has four sides and a wall portion has higher wall portions in proximity to but away from corners of the fence structure, the corners of the fence structure corresponding to the extremities or the radiators.

19. The antenna structure of claim 18, wherein one set of oppositely facing wall portions has a different height distribution than the other set of oppositely facing wall portions.

20. The antenna structure of claim 16, wherein wall portions of the fence structure include higher wall portions in proximity to of the fence structure, the higher wall portions tapering in height toward the comers to a height that is lower than a maximum height of the higher wall portions.

21. The antenna structure of claim 20, wherein wall portions between the higher wall portions have a height that is less than a height of the higher wall portions.

22. The antenna structure of claim 20, wherein the higher wall portions are positioned in first areas to reduce mutual coupling between adjacent antenna structures as compared to mutual coupling resulting from having lower wall portions in the first areas, and lower wall portions are positioned in second areas to reduce cross polarization between adjacent antenna structures as compared to cross polarization resulting from having higher wall portions in the second areas.

23. The antenna structure of claim 16, wherein lower wall portions of a wall portion of the fence structure have wall height of zero.

24. An antenna element, the antenna element comprising:

a radiator having a feed point and an extremity, the radiator tapering in width along a length extending from the feed point to the extremity, the extremity being a furthest distance from the feed point;

one of a feed strip and ground strip extending from the radiator and having a flat surface, the one of the feed strip and ground strip being bent at a first angle from the radiator to form one conductor of a balanced transmission line; and a flange on each of two sides of the radiator, each flange having a flat surface and being at a second angle from the radiator.

25. The antenna element of claim 24, wherein the extremity has a tab portion to achieve a wider bandwidth as compared to a bandwidth achievable were the extremity to end in a point.

26. The antenna element of claim 24, wherein the radiator, the one of the feed strip and ground strip and the flanges are one of cut and stamped from a same piece of metal to form an integral part consisting of one piece.

27. The antenna element of claim 24, wherein the feed strip is dimensioned to have a length that is up to a quarter wavelength at a frequency in a bandwidth of operation for which the antenna element is designed.

28. The antenna element of claim 24, wherein the radiator is tapered in width in a direction toward the extremity, the taper being definable by straight edges of the radiator having a third angle there between of not more than 90 degrees.

* * * * *